Figure 1:
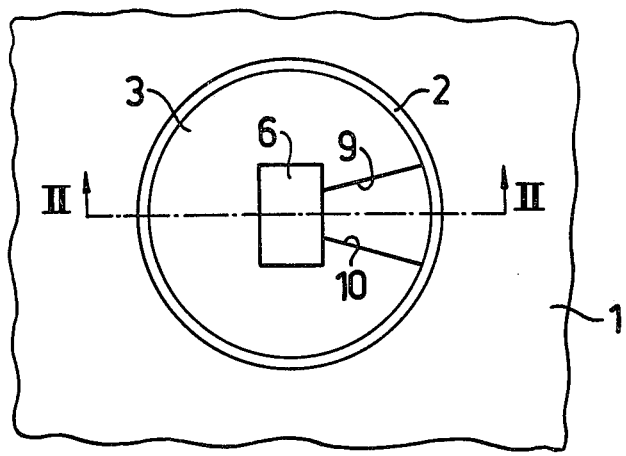

United States Patent [19]

Dahlberg

[11] 4,394,715
[45] Jul. 19, 1983

[54] PROTECTIVE DEVICE FOR A GROUND-DEPOSITED LIGHT

[75] Inventor: Anders Dahlberg, Täby, Sweden

[73] Assignee: Tatis Plasttatnigar AB, Täby, Sweden

[21] Appl. No.: 177,535

[22] PCT Filed: Mar. 28, 1979

[86] PCT No.: PCT/SE79/00070
§ 371 Date: Nov. 30, 1979
§ 102(e) Date: Nov. 28, 1979

[87] PCT Pub. No.: WO79/00849
PCT Pub. Date: Nov. 1, 1979

[30] Foreign Application Priority Data

Mar. 30, 1978 [SE] Sweden ................................ 7803611

[51] Int. Cl.³ .................................................. F21S 1/02
[52] U.S. Cl. ..................................... 362/153; 362/145; 362/268; 362/311; 362/330; 362/335; 362/364; 362/369; 362/375; 362/390
[58] Field of Search ............... 362/153, 145, 268, 311, 362/330, 335, 364, 369, 375, 390

[56] References Cited

U.S. PATENT DOCUMENTS 3,007,034 10/1961 Reed et al. ........................... 362/153
4,112,485 9/1978 Sutter .................................... 362/369
4,150,422 4/1979 Peralta et al. ........................ 362/369

FOREIGN PATENT DOCUMENTS 2226932 12/1973 Fed. Rep. of Germany .
995060 11/1965 France .

Primary Examiner—Stephen J. Lechert, Jr.
Attorney, Agent, or Firm—Griffin, Branigan & Butler

[57] ABSTRACT

A protective device for a ground-deposited light is disclosed. Such a light, e.g. a guide-light for airfield use, generally includes a housing (2) having a cover (3) provided with an opening (5) for letting out light rays from a lamp (4) within the housing. To protect the lamp from rain, snow and dirt the opening is sealed by a translucent material. To protect the translucent material from mechanical influence grains of a harder material than the translucent material are partly embedded therein.

20 Claims, 4 Drawing Figures

U.S. Patent     Jul. 19, 1983     4,394,715

PROTECTIVE DEVICE FOR A GROUND-DEPOSITED LIGHT

Airfields utilize so called guide-lights to direct airplanes on the ground along taxiways as well as to and from parking places on the aprons. A known type of such a light comprises a well located in the ground and having a cover, the upper surface of which is located generally at level with the taxiway and which contains a source of light. The cover has at least one eccentrical recess through which the beam from the source of light is directed in a defined main direction. The recess is open upwardly permitting rain, snow and dirt practically freely to get in contact with the source of light. This source is generally a light-bulb with an efficiency in the range of 150 Watts and, thus, it becomes very warm when in use. At contact with rain or snow the light-bulb bursts much too frequently, and humidity can, of course, cause a short-circuit in the electric system.

An object of the invention is to provide a guide-light that is insensitive to weather disturbances. Another object is to provide a guide-light that is resistant to mechanical influence by cleaning and snow-clearance equipment without diminishing its light-emitting function. The invention is, of course, just as applicable on other ground-deposited lights, such as runway lights.

These objects are achieved by the present invention as defined in the annexed claims.

Figure 2:
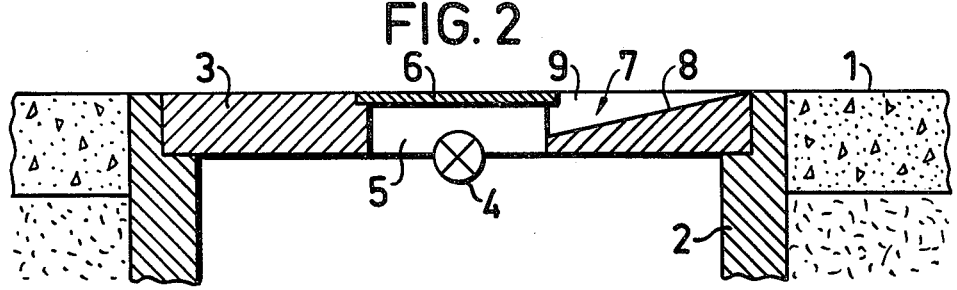
Figure 3:
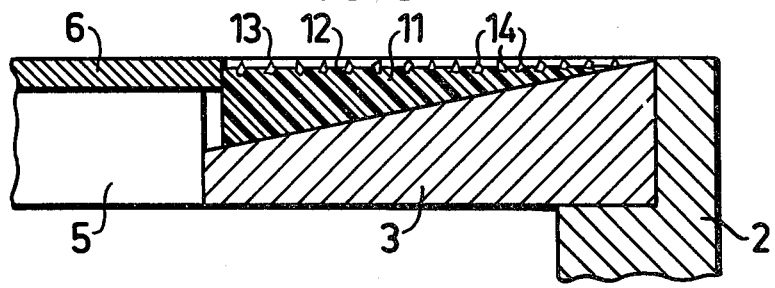
Figure 4:
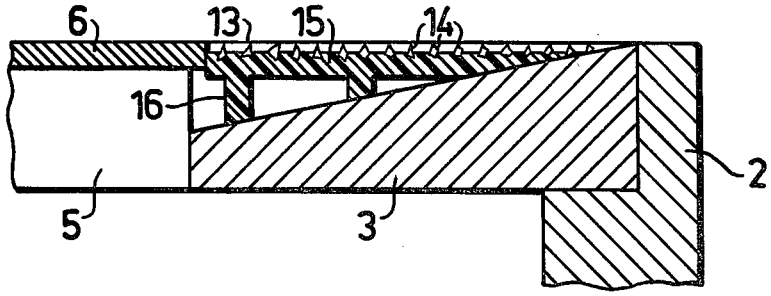

The invention is described in detail below with reference to the attached drawing wherein FIG. 1 shows from above a conventional guide-light deposited into the ground, FIG. 2 shows at a larger scale a sectional view along line II—II of FIG. 1, FIGS. 3 and 4 show, at an even larger scale, the right part of the section II—II, wherein the known guide-light has been completed by two different embodiments of the invention.

In a hard-made ground surface 1, e.g. a strip of concrete, is located a well 2 having a cover 3. The upper surface of the cover 3 is located in the level of the strip 1. In the well 2 is mounted a lamp 4 (not shown in detail). The cover 3 has a central opening 5, which is sealed upwardly by a plate 6, said plate being removable to facilitate e.g. a change of bulb. In order to make the light visible only in a certain main direction a recess 7 is cut into the cover 3, said recess having a bottom 8 inclining upwards from the opening 5 towards the peripheri of the cover and sidewalls 9 and 10 diverging in the same direction thereby limiting the spreading of the light horizontally as well as vertically.

Due to the fact that the recess 7 directly leads down to the opening 5 and the relatively unprotected lamp 4, the light now described is very sensitive to penetration of water, snow and dirt, which hitherto has brought great operational problems.

According to the invention these problems are solved by sealing the recess 7 with a transparent material. FIG. 3 shows an embodiment wherein the transparent material 11, preferably a synthetic plastic material of a curing type, such as epoxy resin, is moulded in the recess, so that its top surface 12 lies somewhat below the plane 13 of the cover 3. Through this level difference a direct contact between the transparent material and e.g. snow-plows is avoided.

In certain cases rotating steel brushes are used for cleaning work at airports. To protect the transparent material from being scratched by such brushes, grains 14 of a very hard material are embedded, at least partly, in the transparent material, that is a material which is harder than the transparent material and preferably also harder than the steel used in said brushes and snow-plows.

The grains 14, which may be of some suitable mineral, hard metal, sintered metal or a ceramic, are placed with their upper edges at the level of the plane 13 of the cover 3 and are embedded in the transparent material to one third or more, i.e. such that two thirds or less protrudes above the surface of the transparent material.

Practical tests have shown that a suitable grain-size could range between 1 and 5 mm, preferably between 1.5 and 3 mm, while the grain spacing could range between 1–10 mm and preferably 2–3 mm.

As an example it can be mentioned that 2 mm grains of a hard mineral, which were embedded in epoxy resin to a depth of 1 mm and were protruding from same about 1 mm, i.e. levelling with the upper surface of the cover, and which were relatively spaced about 2–3 mm, have rendered very good results when a cover according to FIGS. 1 and 2 were run over by snow-plows as well as by rotating steel brushes. Hereby the cover was damaged, while the grains as well as the epoxy resin remained intact.

FIG. 4 shows another embodiment of the invention, where the transparent material is formed as a generally plane-parallel plate 15, which is supported by supports 16 integral with the plate.

Although not shown in the drawing, the surface of the transparent material may as well be slightly convex or concave, or it may be somewhat inclined downwardly in the direction of the light rays emitted. This last-mentioned messure may be used where the light, due to certain regulations, must be visible a few degrees above the ground surface.

It has also proved possible to have the entire or a portion of the upper surface of the transparent material located at, or even slightly above the ground level. In such cases, of course, the grains 14 will be located at a correspondingly higher level.

The invention is, of course, not limited to be used with the known guide-light herein described, but can likewise be used in other applications, e.g. where the source of light is mounted straight below the transparent material.

By the word transparent, as herein used, the meaning translucent should also be understood.

I claim:

1. A protective device for a ground-deposited light comprising:
   a housing;
   a light source located in said housing, said housing having at least one opening therein for letting light out of said housing;
   transparent sealing materials for sealing said opening; and,
   granular particles that are harder than said transparent sealing material, said granular particles being partly embedded in said transparent sealing material and partly protruding above the surface thereof for protecting said transparent sealing material against abrasion.

2. A device according to claim 1 wherein an upper surface of said transparent material is plane.

3. A device according to claim 2 wherein said upper surface of said transparent material is parallel to the ground.

4. A device according to claim 3 wherein said upper surface of said transparent material is located slightly below the ground.

5. A device according to claim 3 wherein said upper surface of said transparent material is located at ground level.

6. A device according to claim 2 wherein said upper surface of said transparent material is inclined downwardly in the direction of the emitted light rays.

7. A device according to claim 6 wherein said upper surface of said transparent material is at least partly located above the ground level.

8. A device according to claim 1 wherein an upper surface of said transparent material is convex.

9. A device according to claim 8 wherein said upper surface of said transparent material is at least partly located above ground level.

10. A device according to claim 1 or 2 or 3 or 4 wherein the upper edges of said granular particles are located substantially at ground level.

11. A device according to claim 1 wherein said transparent material is a curing synthetic resin.

12. A device of claim 11 wherein said curing synthetic resin is an epoxy resin.

13. A device according to claim 11 wherein said synthetic resin is molded in said opening.

14. A device according to claim 1 wherein said granular particles have a higher degree of hardness than hardened steel.

15. A device according to claim 14 wherein said granular particles are selected from the group consisting of a mineral, a hard metal, a sintered metal, and a ceramic.

16. A device according to claim 1 wherein the grain-size of said granular particles is in the range of 1–5 mm.

17. A device of claim 16 wherein said grain size is between 1.5 and 3 mm.

18. A device according to claim 1 wherein the spacing between individual grains of said granular particles is in the range of 1–10 mm.

19. A device of claim 18 wherein said spacing is between 2 and 3 mm.

20. A device according to claim 1 wherein said granular particles are embedded in said transparent material to at least one-third of their height.

* * * * *